(12) United States Patent
Kim (10) Patent No.: US 10,677,298 B2
(45) Date of Patent: Jun. 9, 2020

(54) METHOD OF LEARNING TOUCH POINT OF DUAL CLUTCH TRANSMISSION

(71) Applicant: HYUNDAI AUTRON CO., LTD., Seoul (KR)

(72) Inventor: Min-Hyo Kim, Gwangju-si (KR)

(73) Assignee: Hyundai Autron Co., Ltd., Seoul (KR)

( * ) Notice: Subject to any disclaimer, the term of this patent is extended or adjusted under 35 U.S.C. 154(b) by 0 days.

(21) Appl. No.: 16/193,967

(22) Filed: Nov. 16, 2018

(65) Prior Publication Data
US 2019/0162251 A1 May 30, 2019

(30) Foreign Application Priority Data

Nov. 30, 2017 (KR) .......................... 10-2017-0162975

(51) Int. Cl.
*F16D 48/06* (2006.01)
*F16H 61/688* (2006.01)
*F16H 61/06* (2006.01)

(52) U.S. Cl.
CPC ............ *F16D 48/06* (2013.01); *F16H 61/688* (2013.01); *B60Y 2300/427* (2013.01);
(Continued)

(58) Field of Classification Search
CPC ............. F16D 48/06; F16D 2500/3067; F16D 2500/50251; F16D 2500/50269;
(Continued)

(56) References Cited

U.S. PATENT DOCUMENTS

| 5,337,874 A * | 8/1994 | Oltean ................. B60W 10/02 |
| | | 192/111.12 |
| 2013/0151093 A1* | 6/2013 | Dourra ................ F16H 61/0204 |
| | | 701/59 |

(Continued)

FOREIGN PATENT DOCUMENTS

| CN | 104373590 A | 2/2015 |
| CN | 106704412 A | 5/2017 |

(Continued)

OTHER PUBLICATIONS

Office Action, Chinese Patent Application No. 201811397927.8, Chinese Intellectual Property Office, dated Feb. 25, 2020, China.

*Primary Examiner* — Edwin A Young
(74) *Attorney, Agent, or Firm* — Baker & Hostetler LLP; Hyunho Park (57) ABSTRACT

Provided is a method of learning a touch point of a dual clutch transmission (DCT), and more particularly, to a DCT touch point learning method in which a touch point is learned based on a difference between a virtual input shaft speed and a clutch non-drive shaft input speed using a virtual input shaft reference speed calculated based on the speed of a traveling vehicle. In a traveling situation in which the touch point cannot be learned using the non-drive shaft according to the related art because the input shaft behavior of the non-drive shaft is rotationally synchronized with the input shaft behavior of the drive shaft by drag characteristics of the DCT, a virtual input shaft speed may be calculated, and the touch point of the clutch may be learned using the virtual input shaft speed.

7 Claims, 7 Drawing Sheets

(52) U.S. Cl.
CPC ........... *F16D 2500/3067* (2013.01); *F16D 2500/30806* (2013.01); *F16D 2500/30816* (2013.01); *F16D 2500/3108* (2013.01); *F16D 2500/50251* (2013.01); *F16H 2061/064* (2013.01); *F16H 2342/042* (2013.01)

(58) Field of Classification Search
CPC .......... F16H 61/688; F16H 2061/064; F16H 2342/042; B60Y 2300/427
See application file for complete search history.

(56) References Cited

U.S. PATENT DOCUMENTS

2013/0297122 A1* 11/2013 Gibson ............... B60W 20/40
701/22
2017/0101098 A1* 4/2017 Gibson ............... B60W 10/02

FOREIGN PATENT DOCUMENTS

| | | |
|---|---|---|
| CN | 106969139 A | 7/2017 |
| DE | 102016104841 A1 | 5/2017 |
| JP | 2015209973 A | 11/2015 |
| KR | 20090062412 A | 6/2009 |
| KR | 10-1355620 B1 | 1/2014 |
| KR | 10-2014-0060013 A | 5/2014 |
| KR | 101406625 B1 | 6/2014 |
| KR | 20140104562 A | 8/2014 |
| KR | 10-2015-0011482 A | 2/2015 |
| KR | 10-2016-0059020 A | 5/2016 |
| KR | 101684173 B1 | 12/2016 |

* cited by examiner

METHOD OF LEARNING TOUCH POINT OF DUAL CLUTCH TRANSMISSION

CROSS-REFERENCE TO RELATED APPLICATION

This application claims priority to and the benefit of Korean Patent Application No. 2017-0162975, filed on Nov. 30, 2017, the disclosure of which is incorporated herein by reference in its entirety.

BACKGROUND

1. Field

The present invention relates to a method of learning a touch point of a dual clutch transmission (DCT), and more particularly, to a DCT touch point learning method in which a touch point is learned based on a difference of a reference value or greater between a virtual input shaft speed and a clutch non-drive shaft input speed using a virtual input shaft reference speed calculated based on the speed of a traveling vehicle.

2. Discussion of Related Art

An automated manual transmission is a system that automatically controls a transmission based on a manual shift mechanism. Unlike an automatic transmission using a torque converter and a wet multi-plate clutch, an automated manual transmission uses a dry clutch to transfer an engine torque.

In particular, a dry clutch has characteristics in which a clutch transfer torque changes significantly depending on many factors, such as abrasion due to individual tolerances and durability of components, thermal deformation due to high temperature, changes in friction coefficients of a disk, etc. Thus, it is difficult to estimate a torque transferred to the clutch while the vehicle is running.

Accordingly, when the change in transfer torque is not known during the clutch control, an excessive slip or a shock may occur in the clutch. Thus, an algorithm for predicting the torque characteristics of the dry clutch in real time is needed.

Conventionally, the transfer torque characteristics and the touch point of the clutch are predicted through a torque-stroke curve (T-S curve) of the dry clutch.

Here, the T-S curve is a curve that represents the transfer torque characteristics of the dry clutch according to a movement amount (stroke) of a clutch actuator by using data, and the touch point indicates a position (stroke) of the clutch actuator at a time point when power begins to be transferred to the clutch on the T-S curve.

Conventionally, the touch point is learned while a gear is not engaged with a non-drive shaft (while the gear is in a neutral state).

That is, while the gear of the non-drive shaft is switched to the neutral state and the input shaft speed of the non-drive shaft is reduced during freewheeling, there is a change in acceleration of the non-drive shaft when a clutch torque is slowly applied. A point in which the change in acceleration is generated may be recognized as the touch point because the change in acceleration indicates that power begins to be transferred by the clutch.

However, the input shaft speed of the freewheeling non-drive shaft may not be reduced due to drag characteristics of the transmission while the vehicle is running and may be associated with the input shaft speed of the drive shaft. Therefore, it is possible to accurately learn the touch point through a conventional touch point learning method when the input shaft of the drive shaft and the input shaft of the non-driving shaft rotate in approximate synchronization with each other. Accordingly, in addition to the aforementioned touch point learning method, another way to learn the touch point is required.

It should be understood that the foregoing description of the background is merely for the purpose of promoting an understanding of the background of the present invention and is not to be construed as an admission that the background corresponds to the related art known to those skilled in the art.

SUMMARY

Accordingly, the present invention has been devised to solve the aforementioned problems, and the present invention is directed to providing a dual clutch transmission (DCT) touch point learning method capable of calculating a virtual input shaft speed and learning a touch point using the virtual input shaft speed in a traveling region where the touch point cannot be learned according to the related art because the input shaft speed behavior of the drive shaft is synchronized with the input shaft speed behavior of the non-drive shaft while a vehicle is traveling.

According to an aspect of the present invention, there is provided a method of learning a touch point of a dual clutch transmission, the method including a learning section check step in which a clutch touch point should be learned in a section, a virtual gear ratio calculation step in which a virtual gear ratio is calculated using a current vehicle speed and a tire diameter, a virtual input shaft speed calculation step in which a virtual input shaft speed is calculated using the virtual gear ratio calculated through the virtual gear ratio calculation step, a touch application step in which a torque is applied to a non-drive shaft such that the speed of the non-drive shaft is equal to an engine speed, a touch point learning determination step in which whether to learn a touch point is determined depending on whether a predetermined condition is satisfied, and a touch point update step in which a newly learned touch point is determined and stored.

The learning section check step may include a non-drive shaft speed change check step in which whether the non-drive shaft rotates at a constant speed is checked, a vehicle speed change check step in which whether a change in speed of a traveling vehicle is maintained is checked, and a difference value check step in which a difference between the engine speed and the non-drive shaft speed is checked.

The virtual gear ratio calculation step may include setting a virtual gear ratio TGearRat_vir using a current vehicle speed VSP and an actual non-drive shaft speed ni_local corresponding to the current vehicle speed.

The virtual input shaft speed calculation step may include calculating a virtual input shaft speed on the basis of a gear ratio that is virtually set.

Also, the touch point learning determination step may include a speed difference comparison step in which the non-drive shaft speed is compared to the virtual input shaft speed derived through the virtual input shaft speed calculation step and a clutch position determination step in which whether a clutch position is less than or equal to a predetermined reference is determined.

The method may further include a clutch position learning amount correction step in which a position learning amount of a clutch is corrected after a condition is satisfied after the touch point learning determination step, and the clutch position learning amount correction step may include performing correction by applying a correction value to the clutch position learning amount according to the speed of the non-drive shaft and the change in speed of the non-drive shaft.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Example embodiments of the present invention will be described below in detail with reference to the accompanying drawings.

The terminology used herein is for the purpose of describing particular embodiments only and is not intended to be limiting the invention. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or a combination thereof.

It should be understood that, although the terms first, second, etc. may be used herein to describe various elements, these elements are not be limited by these terms. These terms are used only to distinguish one element from another.

Moreover, terms such as "part," "unit," and "module" used herein refer to an element for performing at least one function or operation, and may be implemented in hardware, software, or a combination thereof.

In the following description with reference to the accompanying drawings, the same reference numerals will be given to the same elements, and a duplicate description thereof will be omitted. Moreover, detailed descriptions related to well-known functions or configurations will be ruled out in order not to unnecessarily obscure subject matters of the present invention.

The present invention relates to a method of learning a touch point of a dual clutch transmission (DCT), and more particularly, to a DCT touch point learning method in which a touch point is learned based on a difference of a reference value or greater between a virtual input shaft speed and an engine speed using a virtual input shaft reference speed calculated based on the speed of a traveling vehicle.

Figure 7:
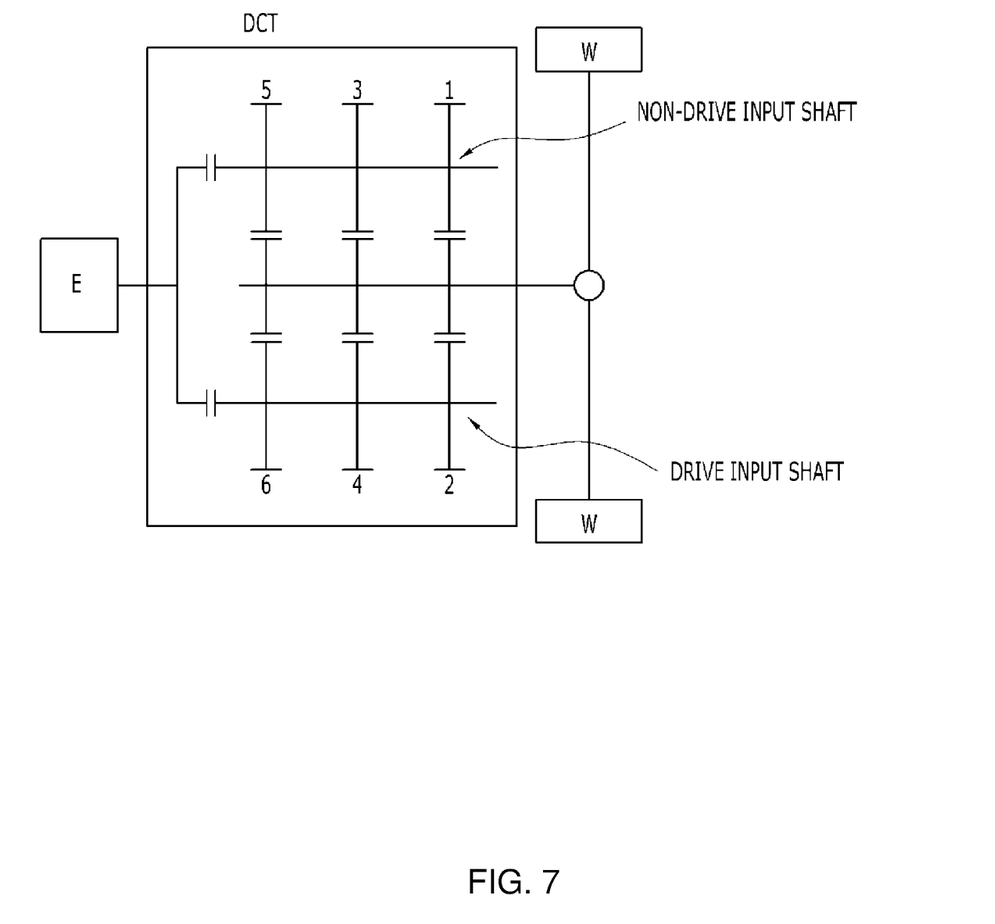
FIG. 7 is a schematic diagram showing a DCT according to an embodiment of the present invention.

The characteristics of a DCT will be described with reference to FIG. 7. The DCT is provided in connection with an engine output end for transferring a driving force generated by an engine. Two (dual) shafts are arranged in parallel with and alternately engaged with the output end of the engine to perform shifting.

The two (dual) shafts of the DCT are represented as a drive shaft and a non-drive shaft. The non-drive shaft refers to a shaft that is not engaged with the current output end of the engine and that is configured to follow a rotational speed of the output end of the engine and rotate while being not engaged with the output end.

Conventionally, while the gear of the non-drive shaft is switched to the neutral state and the input shaft speed of the non-drive shaft is reduced during freewheeling, there is a change in acceleration of the non-drive shaft when a clutch torque is slowly applied. A method of generating a point, in which the change in acceleration is generated as the touch point, is used because the change in acceleration indicates that power begins to be transferred by the clutch.

However, the input shaft speed of the freewheeling non-drive shaft may not be reduced due to drag characteristics of the transmission while the vehicle is running at high speeds and may be associated with the input shaft speed of the drive shaft. Therefore, it is possible to accurately learn the touch point through a conventional touch point learning method when the input shaft of the drive shaft and the input shaft of the non-driving shaft rotate in approximate synchronization with each other. Accordingly, in addition to the aforementioned touch point learning method, another way to learn the touch point is required.

Accordingly, in a high-speed running state (e.g., in a fourth or higher gear running state) in which the touch point cannot be learned using the non-drive shaft because the input shaft behavior of the non-drive shaft is rotationally synchronized with the input shaft behavior of the drive shaft by drag characteristics of the DCT, a virtual input shaft speed may be calculated, and the touch point of the DCT may be accurately learned using the calculated virtual input shaft speed. As a result, even in a section where the touch point cannot be learned in the related art, it is possible to secure shift stability and also enhance productivity of a vehicle and reliability of a clutch characteristic curve (T-S curve).

Hereinafter, example embodiments of the present invention for implementing the above-described effects will be described in detail with reference to the accompanying drawings.

Figure 1:
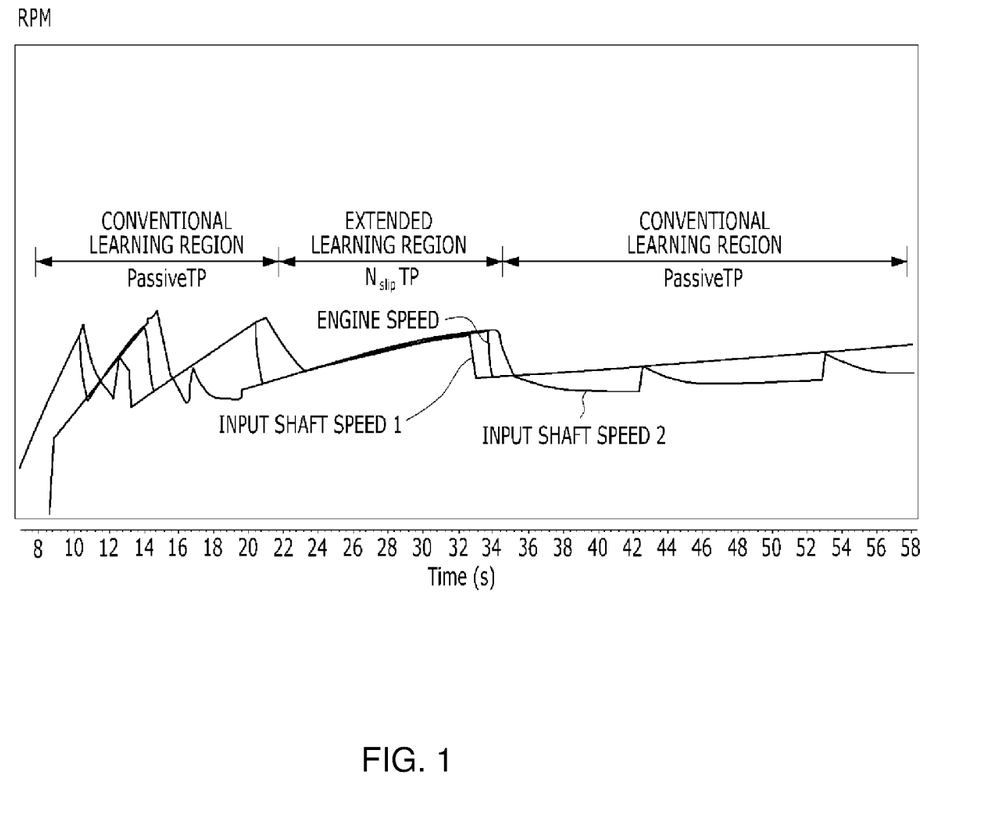
FIG. 1 is a schematic diagram showing a section where a learning region is enlarged according to an embodiment of the present invention.

FIG. 1 is a schematic diagram showing a section where a learning region is enlarged according to an embodiment of the present invention.

As shown in FIG. 1, the learning region according to the related art is limited to a region where there is a considerable difference between an input speed of a drive shaft (input shaft speed 2) and an input speed of a non-drive shaft (input shaft speed 1) by performing slip control of the drive shaft.

As a result, the touch point of the clutch is learned by the speed difference rate, but in a high-speed running region, there is a certain section in which measurement is not possible in such a way.

Accordingly, even when the input shaft behavior of the non-drive shaft is rotationally synchronized with the input shaft behavior of the drive shaft by drag characteristics of the DCT in the case of a high-speed running region (for example, fourth or higher gear running), the learning region is enlarged so that the touch point for the corresponding section can be learned.

Figure 6:
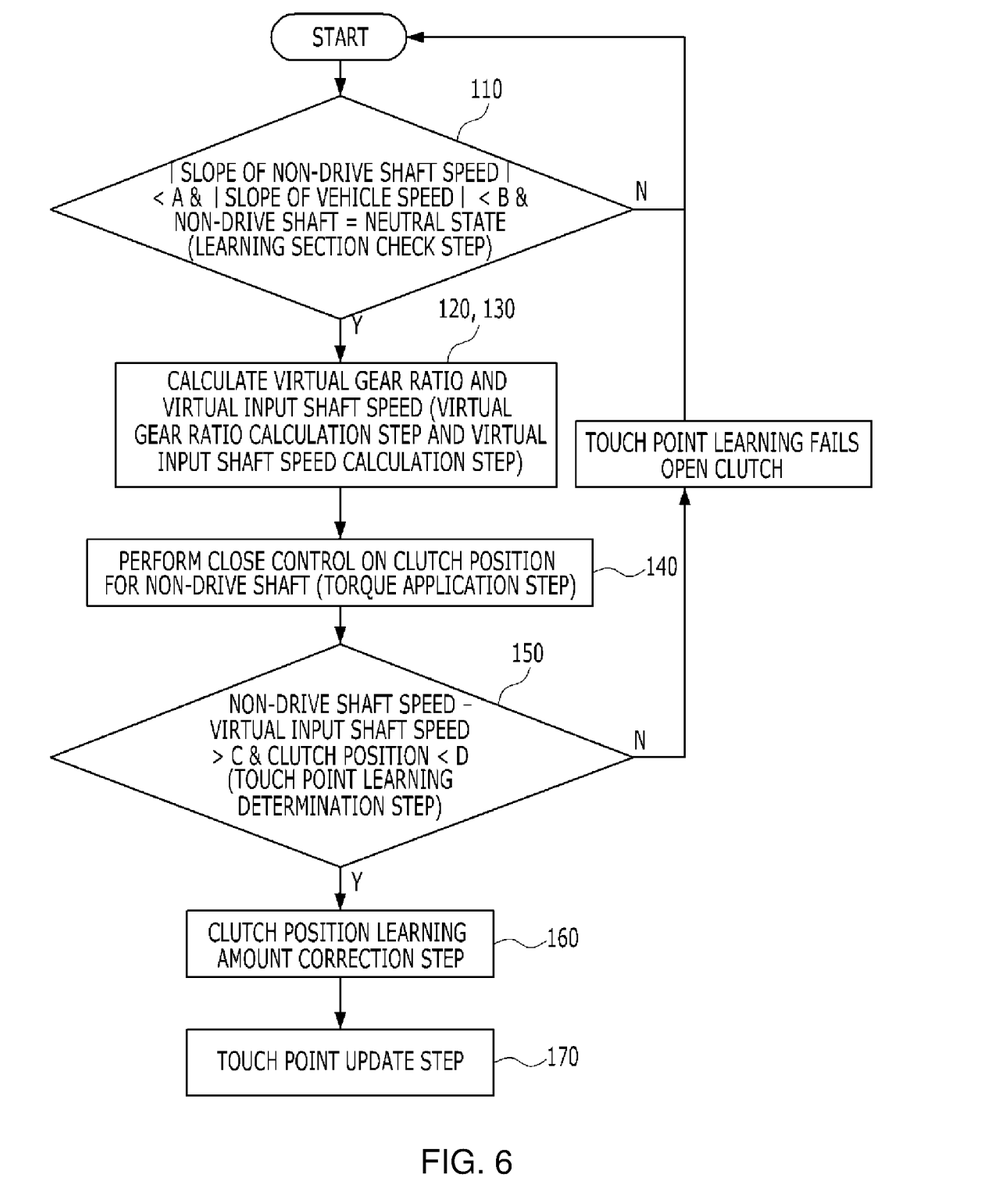
FIG. 6 is a flowchart illustrating a method of learning a touch point of a dual clutch transmission (DCT) according to an embodiment of the present invention.

FIG. 6 is a flowchart illustrating the DCT touch point learning method according to an embodiment of the present invention.

Steps of the method shown in FIG. 6 will be described below with reference to FIGS. 2 to 5.

The DCT touch point learning method according to an embodiment of the present invention may include a learning section check step 110 in which a clutch touch point is required to be learned in a section, a virtual gear ratio calculation step 120 in which a virtual gear ratio is calculated using a current vehicle speed and a tire diameter, a virtual input shaft speed calculation step 130 in which a virtual input shaft speed is calculated using the virtual gear ratio calculated through the virtual gear ratio calculation step, a touch application step 140 in which a torque is applied to a non-drive shaft such that the speed of the non-drive shaft is equal to an engine speed, a touch point learning determination step 150 in which whether to learn a touch point is determined depending on whether a predetermined condition is satisfied, and a touch point update step 170 in which a newly learned touch point is determined and stored.

In detail, since the present invention is applied to the above-described region where the input shaft behavior of the non-drive shaft is rotationally synchronized with the input shaft behavior of the drive shaft by drag characteristics of the DCT in the high-speed running region, the learning section check step 110 may include a non-drive shaft speed change check step in which in order to satisfy a condition that there is a sudden change in speed (i.e., acceleration) of the vehicle, whether the non-drive shaft rotates steadily at a constant speed is checked so that whether the constant speed is maintained is checked, a vehicle speed change check step in which whether a change in speed (acceleration) of a traveling vehicle is maintained is checked, and a difference value check step in which a difference between the engine speed and the non-drive shaft speed is greater than or equal to a reference value.

Also, the learning section check step 110 may further include determining whether the neutral state of the non-drive shaft is maintained.

The learning section capable of achieving the objectives of the present invention may be determined through the learning section check step 110. Assuming that the condition is satisfied, a method of learning a touch point by calculating a virtual input shaft speed will be described below.

In FIGS. 6, A, B, C, and D refer to predetermined values and are characterized by having to be set according to an individual vehicle's traveling state or physical characteristics in order to accurately learn the touch point. There are no restrictions on the values, and the values have been replaced with the characters.

Figure 2:
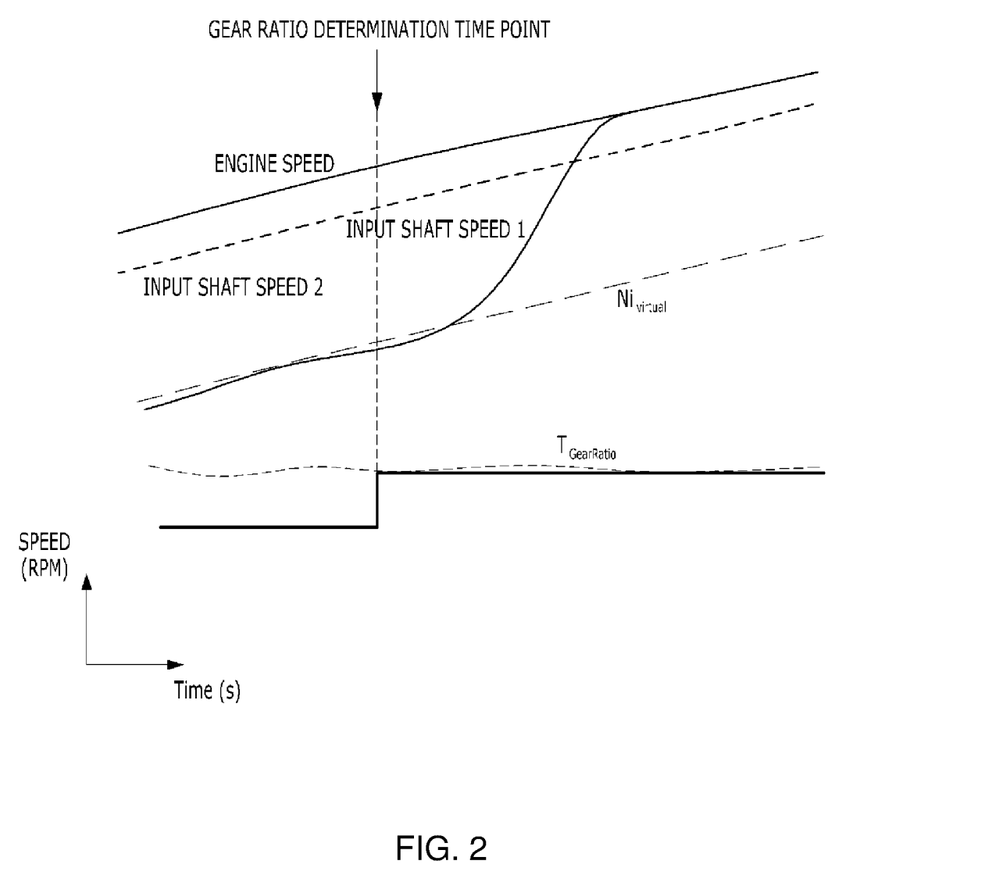
FIG. 2 is a graph showing a virtual input shaft speed calculated using a virtual gear ratio according to an embodiment of the present invention.

FIG. 2 is a graph showing a virtual input shaft speed calculated using a virtual gear ratio according to an embodiment of the present invention.

Referring to FIG. 2, it can be seen that the graph shows an engine speed and a non-drive shaft input speed (input shaft speed 1) in addition to the calculated virtual input shaft speed.

The virtual gear ratio in the graph of FIG. 2 may be calculated using Equation 1 below:

$$T_{GearRat\text{-}vir} = Ni_{local} * (2\pi * \text{Tireradius} * 60)\}/(vsp * 1000) \quad \text{[Equation 1]}$$

where $Ni_{local}$ denotes the actual input speed of the non-drive shaft of the traveling vehicle, and vsp is the current speed of the traveling vehicle.

Accordingly, the virtual gear ratio of the non-drive shaft may be calculated on the basis of the speed of the traveling vehicle and the input speed of the non-drive shaft.

In this case, the virtual gear ratio may be calculated on the basis of the input speed of the non-drive shaft at a certain point. Here, the certain point, that is, a gear ratio determination time point, may be a time point when the learning section check step 110 is completed as described above.

Thus, after the learning section check step 110 is completed, the virtual gear ratio is fixed by the current input speed of the non-drive shaft, and the fixed value is used as the virtual gear ratio until the touch point is learned.

A stepped line $T_{GearRatio}$ shown in the bottom of FIG. 2 indicates that the virtual gear ratio is not computed and calculated before the gear ratio determination time point and that the gear ratio is fixed at the gear ratio determination time point and maintained until the touch point is learned.

A dotted line $T_{GearRatio}$ shown in the bottom of FIG. 2 assumes a gear ratio that is constantly calculated through the computation. It can be seen that the constantly calculated gear ratio is the same as the gear ratio calculated at the gear ratio determination time point.

The calculated and fixed virtual gear ratio may be used to calculate the virtual input shaft speed and may be calculated using Equation 2 below:

$$Ni_{virtual} = (vsp * 1000 * T_{GearRat\text{-}vir})/(2\pi * \text{Treradius} * 60) \quad \text{[Equation 2]}$$

Through Equation 2, the virtual input shaft speed $Ni_{virtual}$ may be calculated through the virtual gear ratio $T_{GearRat\text{-}vir}$.

In this case, the vehicle speed continues to increase, but there is no significant change in acceleration. As a result, it can be seen that the vehicle speed vsp increases linearly and the virtual input shaft speed also increases linearly.

Also, the virtual input shaft speed calculated through Equation 1 and Equation 2 may be compared to the speed of the non-drive shaft and may be used to accurately derive a touch point value in the subsequent steps.

Figure 3:
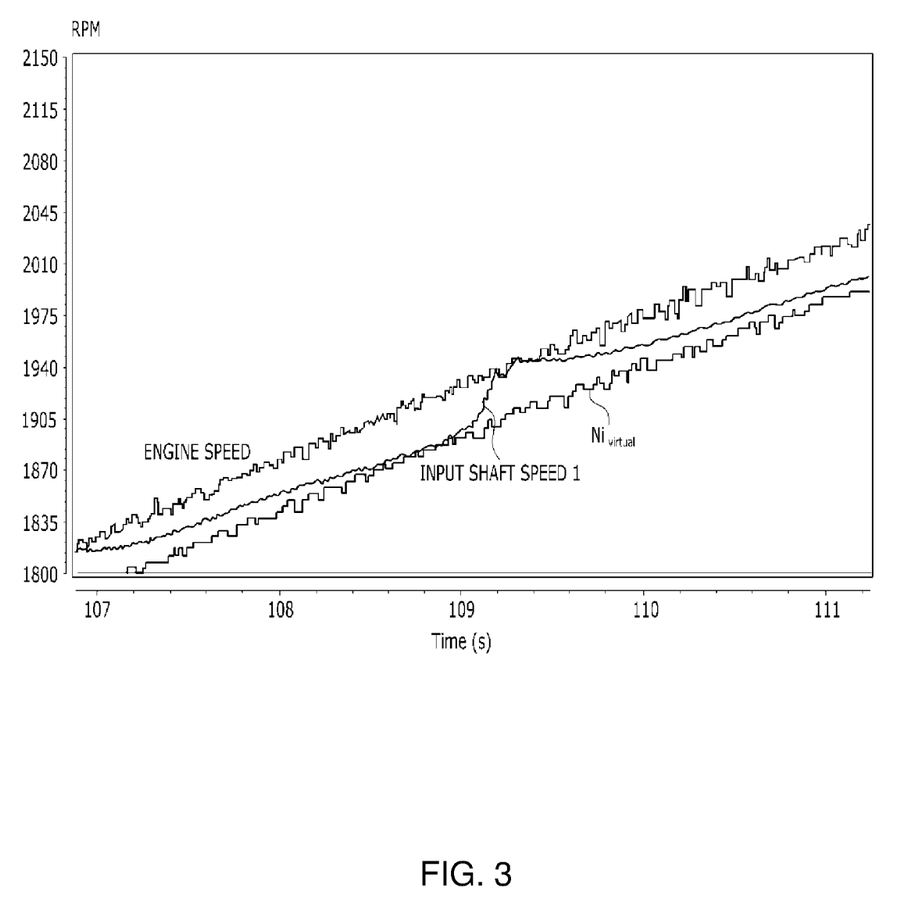
FIG. 3 is a schematic diagram illustrating a certain section of the graph showing the virtual input shaft speed calculated using the virtual gear ratio according to an embodiment of the present invention.

FIG. 3 is a schematic diagram illustrating a certain section of the graph of FIG. 2 showing the virtual input shaft speed calculated using the virtual gear ratio according to an embodiment of the present invention.

Referring to FIG. 3, it can be seen that the virtual input shaft speed $Ni_{virtual}$ may be derived according to the virtual gear ratio $T_{GearRat\text{-}vir}$ and may be directly compared to the non-drive shaft speed (input shaft speed 1).

Figure 4:
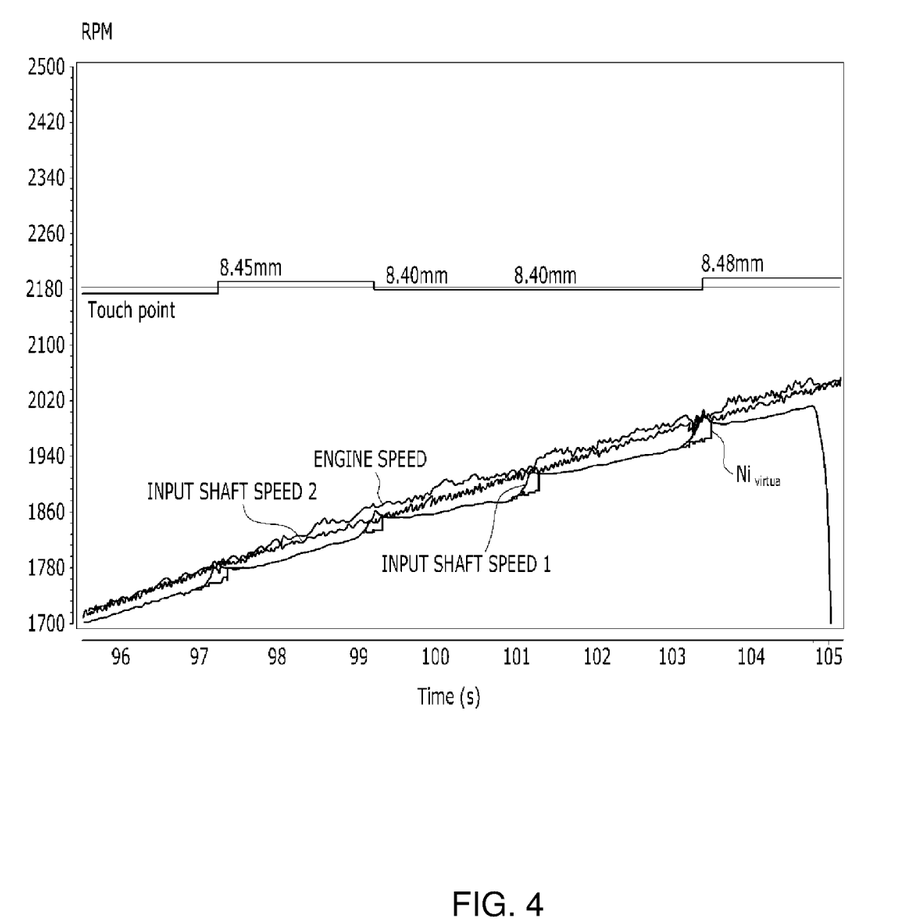
FIG. 4 is a graph showing a touch point and a certain time period in addition to the virtual input shaft speed calculated using the virtual gear ratio according to an embodiment of the present invention.
Figure 5:
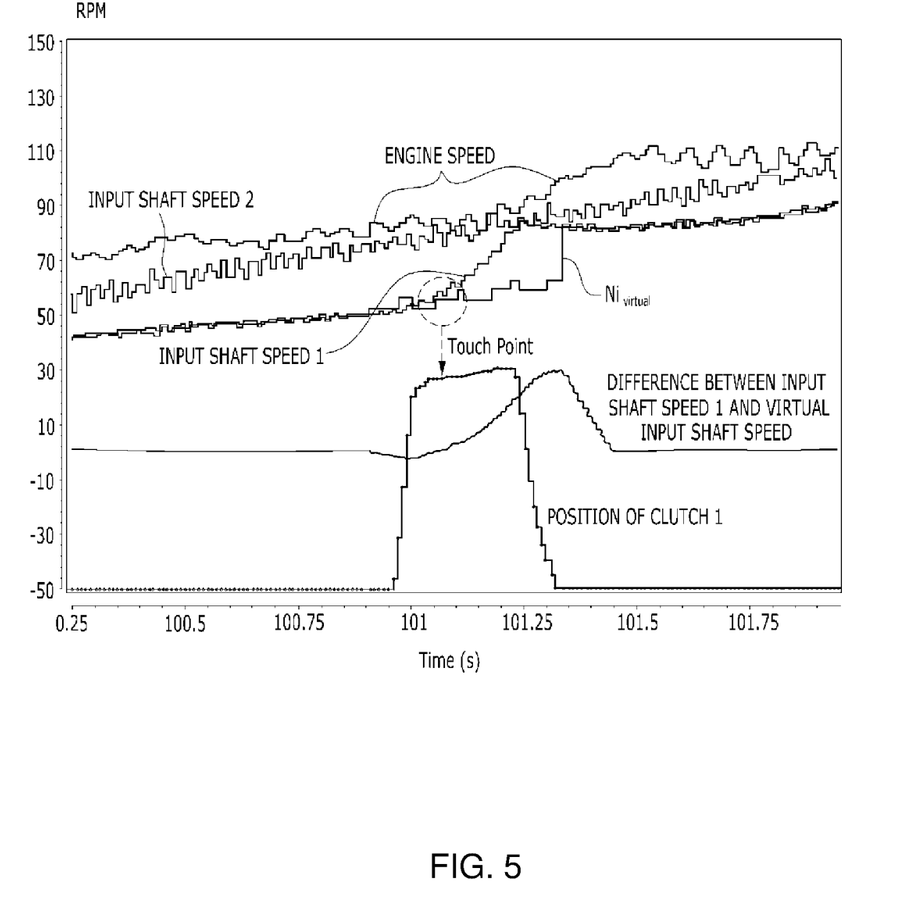
FIG. 5 is a graph showing a clutch position (stroke) and a speed difference by partially enlarging the graph of FIG. 4.

In this case, unlike in FIGS. 4 and 5, it can be seen from FIG. 3 that the virtual input shaft speed increases linearly even after the touch point. This is because a virtual input shaft speed is not additionally computed after the learning of the touch point is completed in FIGS. 4 and 5 and there is a difference from a description of being the same as the speed of the non-drive shaft (input shaft speed 1) (i.e., FIG. 2 shows a case in which the virtual input shaft speed continues to be computed).

After the virtual input shaft speed is calculated through the computation of the equations, the clutch of the traveling vehicle may be controlled to be closed in a direction of the engine by applying a torque to the clutch.

The close control of the clutch causes a change in position of the clutch. The touch point may be ultimately learned by calculating correlations between the change in clutch position and the virtual input shaft speed and the speed of the non-drive shaft (input shaft speed 1).

FIG. 4 is a graph showing a touch point and a certain time period in addition to the virtual input shaft speed calculated using the virtual gear ratio according to an embodiment of the present invention.

FIG. 5 is a graph showing a clutch position (stroke) and a speed difference by partially enlarging the graph of FIG. 4.

The touch point learning determination step 150, a clutch position learning amount correction step 160, and the touch point update step 170 will be described below with reference to FIGS. 4 and 5.

Referring to FIG. 4, it can be seen, from the top of the graph, that a touch point distributed in the range from 8.40 mm to 8.48 mm and stably learned is derived according to the configuration of the present invention.

Also, FIG. 5 corresponds to an enlarged view of a section between 100.25 and 102 with respect to an x axis, that is, a time axis of FIG. 4.

A specific solution step of the present invention will be described with reference to FIG. 5. As described above, by comparing the virtual input shaft speed $Ni_{virtual}$ calculated through Equation 1 and Equation 2 to the speed of the non-drive shaft (input shaft speed 1) controlled in the direction of the engine through the close control of the clutch, it can be seen that a different between the speeds is shown.

In this case, by using a difference between the virtual input shaft speed (which increases linearly due to the fixed virtual gear ratio and the increasing vehicle speed) derived through the configuration provided by the present invention and the speed of the non-drive shaft (input shaft speed 1, which changes significantly by following the speed of the output end of the engine according to the close control of the clutch), a clutch position of a section where the speed difference is started may be learned as the touch point.

In detail, a case in which the difference between the virtual input shaft speed and the speed of the non-drive shaft (input shaft speed 1) exceeds 25% of the standard deviation of the virtual input shaft speed from the average of the virtual input shaft speed or a case in which the difference exceeds 20 RPM from the average of the virtual input shaft speed may be considered as a criterion. When the difference is greater than or equal to the corresponding reference speed, the clutch position (stroke) at the corresponding position may be designated as the touch point.

As described above, the case in which the difference exceeds 25% of the standard deviation of the virtual input shaft speed from the average of the virtual input shaft speed or the case in which the difference exceeds 20 RPM from the average of the virtual input shaft speed may be considered as a criterion. For example, it is also possible to set the criteria as different numerical values other than the suggested numerical values.

As described above, in order to accurately learn the touch point, the touch point learning determination step 150 may be performed. The touch point learning determination step 150 may include a speed difference comparison step in which the speed of the non-drive shaft is compared to the virtual input shaft speed derived through the virtual input shaft speed calculation step 130 and whether a difference therebetween is greater than or equal to a predetermined reference is determined, and a clutch position determination step in which whether a clutch position is less than or equal to a predetermined reference is determined.

When the references are not satisfied in the speed difference comparison step and the clutch position determination step, the learning of the touch point is regarded as failing, and the clutch is controlled to be opened again. In this case, the initial step of the present invention may be restarted.

When the touch point learning determination step 150 including the speed difference comparison step and the clutch position determination step is satisfied, the clutch position learning amount correction step 160 in which the position learning amount of the clutch is corrected when the condition is satisfied may be performed after the touch point learning determination step 150.

In this case, the clutch position learning amount correction step 160 may include applying a correction value to the clutch position learning amount according to a speed of the non-drive shaft and a change in the speed of the non-drive shaft to correct the clutch position learning amount.

For example, the speed of the non-drive shaft may increase nonlinearly. When a change in speed (a slope of acceleration) is significantly large, the slope of the graph (input shaft speed 1) indicating the speed of the non-drive shaft may increase, and thus the correction may be performed by increasing and decreasing the clutch position according to a predetermined relationship.

After the clutch position learning amount correction step 160, the (corrected) clutch position of the section, in which a difference between the ultimately determined virtual input shaft speed and the non-drive shaft speed (input shaft speed 1), is started may be learned and stored as the touch point to update the touch point.

According to the present invention, in a traveling situation in which the touch point cannot be learned using the non-drive shaft according to the related art because the input shaft behavior of the non-drive shaft is rotationally synchronized with the input shaft behavior of the drive shaft by drag characteristics of the DCT, a virtual input shaft speed may be calculated, and the touch point of the clutch may be learned using the virtual input shaft speed. Thus, even in a section in which the touch point cannot be learned according to the related art, it is possible to secure shift stability and also enhance productivity of a vehicle and reliability of a clutch characteristic curve.

The above description is only illustrative of the technical idea of the present invention, and those skilled in the art will appreciate that various modifications, additions and substitutions are possible without departing from the essential characteristics of the invention.

Therefore, the embodiments disclosed herein are intended not to limit but to describe the technical spirit of the present invention, and the scope of the present invention is not limited to the embodiments. The scope of the invention should be construed by the appended claims, and all technical spirits within the scope of their equivalents should be construed as included in the scope of the invention.

What is claimed is:

1. A method of learning a touch point of a dual clutch transmission, the method comprising:
checking, at a learning section check step, a learning section in which a clutch touch point is required to be learned;
calculating, at a virtual gear ratio calculation step, a virtual gear ratio using a current vehicle speed and a tire diameter;

calculating, at a virtual input shaft speed calculation step, a virtual input shaft speed using the virtual gear ratio calculated through the virtual gear ratio calculation step;

applying, at a torque application step, a torque to a non-drive shaft such that a non-drive shaft speed is equal to an engine speed;

determining, at a touch point learning determination step, whether to learn a touch point depending on whether a predetermined condition is satisfied; and determining and storing, at a touch point update step, a newly learned touch point, wherein the newly learned touch point is determined using the virtual input shaft speed.

2. The method of claim 1, wherein checking the learning section comprises:

checking, at a non-drive shaft speed change check step, whether the non-drive shaft rotates at a constant speed;

checking, at a vehicle speed change check step, whether a change in speed of a traveling vehicle is maintained; and checking, at a difference value check step, a difference between the engine speed and the non-drive shaft speed.

3. The method of claim 1, wherein calculating the virtual gear ratio comprises setting the virtual gear ratio ($T_{GearRat\text{-}vir}$) using a current vehicle speed VSP and an actual non-drive shaft speed ($Ni_{local}$) corresponding to the current vehicle speed.

4. The method of claim 1, wherein calculating the virtual input shaft speed comprises calculating the virtual input shaft speed on the basis of a gear ratio that is virtually set.

5. The method of claim 1, wherein determining whether to learn the touch point comprises:

comparing, at a speed difference comparison step, the non-drive shaft speed to the virtual input shaft speed derived through the virtual input shaft speed calculation step; and determining, at a clutch position determination step, whether a clutch position is less than or equal to a predetermined reference.

6. The method of claim 1, further comprising correcting, at a clutch position learning amount correction step, a position learning amount of a clutch after a condition is satisfied after the touch point learning determination step.

7. The method of claim 6, wherein correcting the position learning amount of the clutch comprises performing correction by applying a correction value to the position learning amount of the clutch according to the speed of the non-drive shaft and a change in speed of the non-drive shaft.

* * * * *